United States Patent [19]

Chachere

[11] Patent Number: 5,005,864

[45] Date of Patent: Apr. 9, 1991

[54] VEHICLE FRAME MODIFICATIONS

[76] Inventor: Richard L. Chachere, 2625 Dauphine Pla., Beaumont, Tex. 77705

[21] Appl. No.: 900,374

[22] Filed: Aug. 26, 1986

[51] Int. Cl.$^5$ ............................................. B62D 21/12
[52] U.S. Cl. ................................... 280/800; 296/35.1; 280/785
[58] Field of Search ........................ 280/800, 798, 107; 180/312; 296/35.1

[56] References Cited

U.S. PATENT DOCUMENTS

| | | | |
|---|---|---|---|
| 875,018 | 12/1907 | Verschave | 280/800 |
| 1,593,783 | 7/1926 | Stresau | 280/800 |
| 1,652,159 | 12/1927 | Baker | 180/291 |
| 1,704,843 | 3/1929 | Smith | 280/800 |
| 1,982,105 | 11/1934 | Hughes | 296/35.1 |
| 2,106,385 | 1/1938 | Springer | 296/35.1 |
| 3,177,032 | 4/1965 | Jaskowiak | 296/35.1 |
| 3,534,977 | 10/1970 | Wessel | 280/800 |

Primary Examiner—Charles A. Marmor
Assistant Examiner—Karin Tyson
Attorney, Agent, or Firm—A. Triantaphyllis

[57] ABSTRACT

An apparatus and method are disclosed for modifying motor vehicle frames to provide for the installation of drive line components that are different, heavier or larger than the drive line components originally installed by the manufacturer of the vehicle or drive line components that were not originally present in the vehicle. Accessory hangers to provide support for those, different, heavier, larger or additional drive line components are attached to the frame without adversely affecting the structural integrity of the frame. The accessory hangers are easily removable to provide for the reinstallation of the original drive line components. The engine compartment is enlarged when necessary by providing spacers between the body of the vehicle and the frame to enlarge the height of the engine compartment.

1 Claim, 4 Drawing Sheets

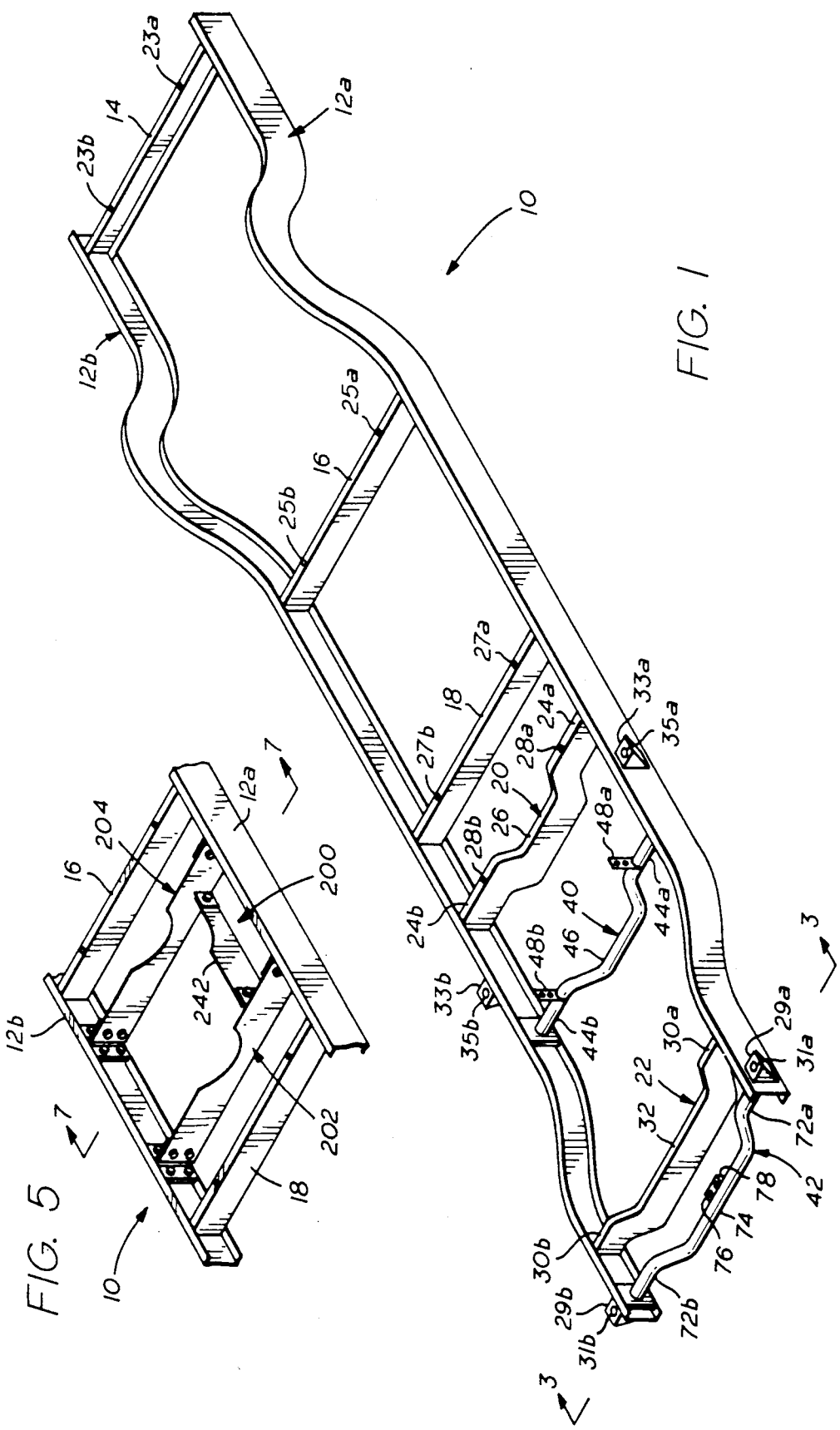

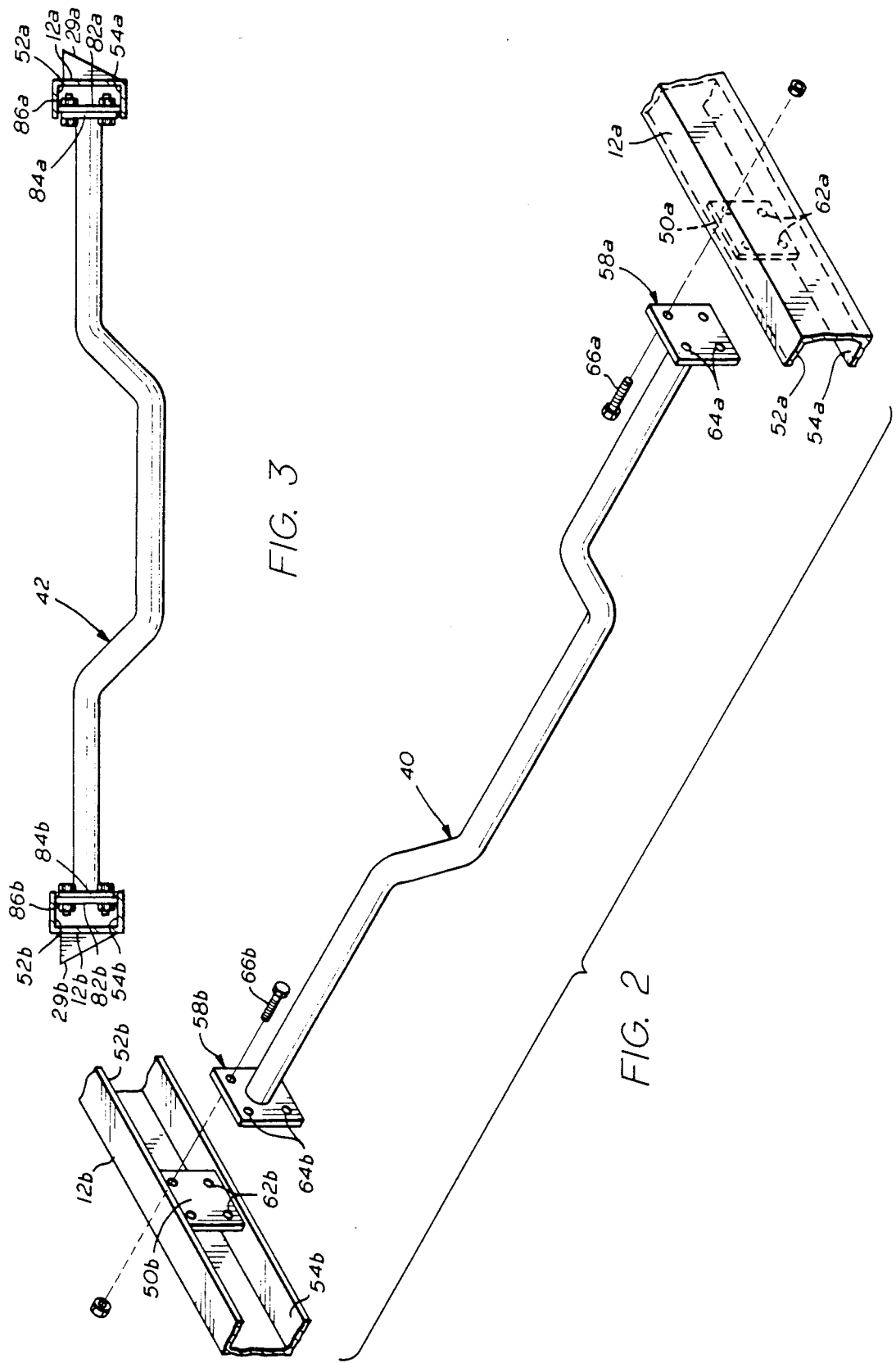

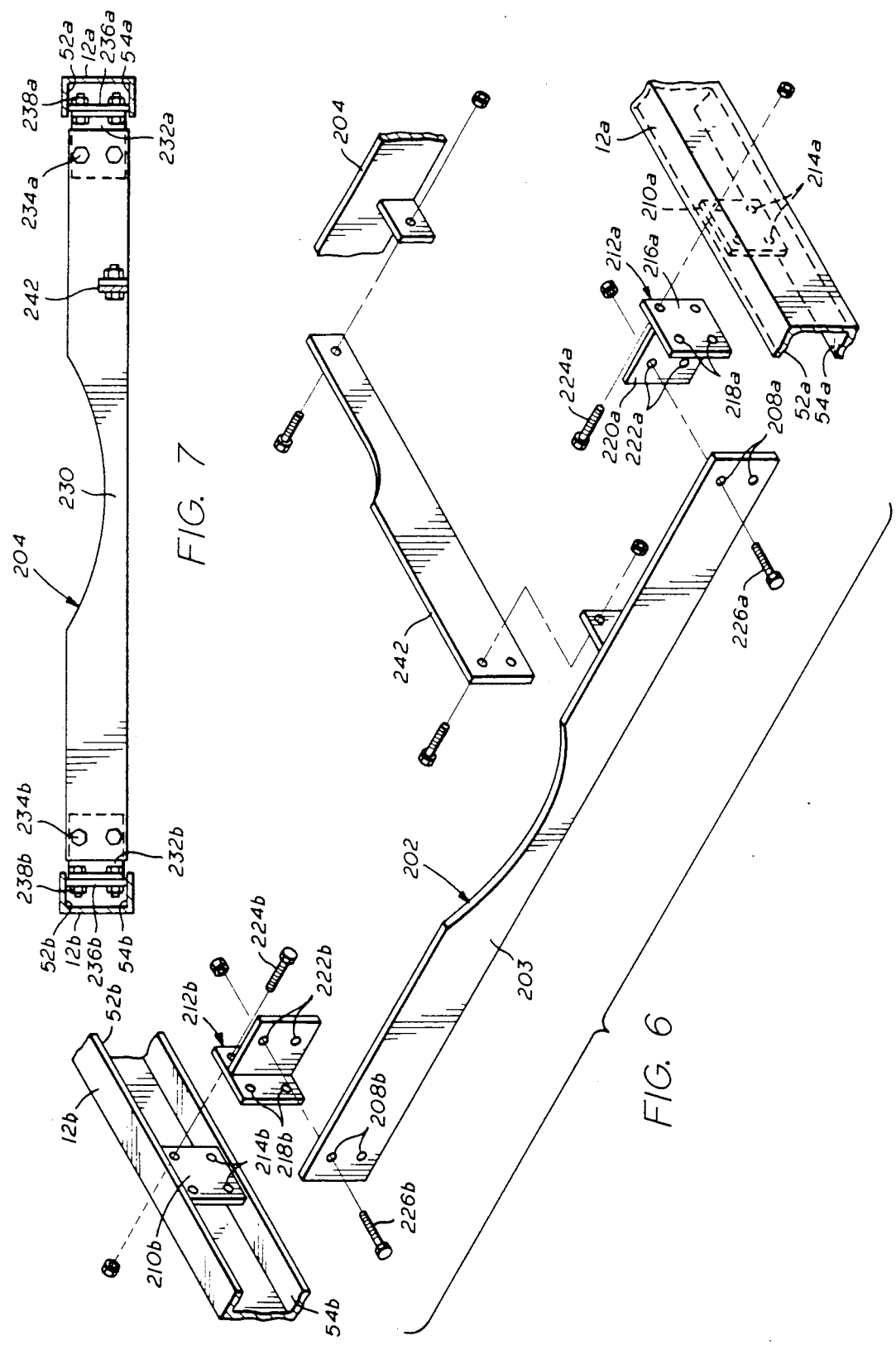

VEHICLE FRAME MODIFICATIONS

TECHNICAL FIELD

The present invention relates to the field of motor vehicle frames, and more particularly to modifications of motor vehicle frames to accommodate the installation of engines that are different from the standard engines that were originally installed in the motor vehicles including, but not limited to, engines that are heavier and larger than the standard engines, and to accommodate the installation of other drive line accessories including overdrive assemblies. Still more particularly, the present invention relates to a mounting assembly for mounting support members for these substitute engines and for those other accessories to motor vehicle frames and to a method for enlarging the engine compartment to house engines that are larger than the standard engines originally installed in the motor vehicle.

BACKGROUND OF THE INVENTION

Modern motor vehicles are commonly comprised of a frame, drive line components, and a vehicle body. Typically, the frame is manufactured of steel or other metallic components using I-beam or channel beam cross sections. These frames are typically sized to fit particular body and drive line components, or a particular range of bodies and drive line components.

Oftentimes, it is desirable to install in the vehicle drive line components other than those supplied by the manufacturer with the vehicle. Examples of that practice include replacing the standard engine of a recreation vehicle or a pick-up truck with one that is more efficient and more powerful such as a diesel engine or the like; replacing the standard engine of a passenger car with a different one; and installing an overdrive assembly to a vehicle that did not have one previously. One difficulty with substituting standard drive line components with other components is that, oftentimes, those drive line components are heavier or larger than the components being replaced. Another difficulty is that, oftentimes, there are no provisions for the installation of a component because it is a component different than the standard one or because it is an added component not previously present. An example of such component is an overdrive assembly. Because the frames are usually designed for a particular body and drive line components, it is difficult and often impossible to install body and drive line components different than the original ones within the space or strength limitations of the frame. More particularly, instances arise where drive line components, other than those supplied with the vehicle, will fit within the space limitation of the size of the frame but they will not fit within the envelope of the existing frame cross members, or support members may be lacking at the particular point where the new drive line component requires some type of support. It is therefore necessary to modify the existing frame to provide for the additional space and support requirements for the new components.

Adding support members to motor vehicle frames is an often difficult proposition. The frame is a delicately balanced set of frame side members or rails and cross members. As most frames consist of individual pieces welded together, and the heat of the welding can change the crystalline structure of the metal and create stresses and distortions in the frame, the manufacturer must take steps to overcome those problems. Such steps may include stress relieving, employing special steels or welding techniques, or manufacturing the frame on specialized tooling. In order to avoid disturbing the crystalline structure of the frame and creating weak spots in the frame, it is necessary that special care be taken and certain practices be avoided when adding to or subtracting from the original structural elements of the frame. One should avoid, for example, welding an additional cross member into the trough of the channel side beam or into the trough of the I-beam because such welding may cause distortion in the frame or a weak point in the side member. Furthermore, one should avoid bolting a cross member into the side beam because such bolting may create weak spots in the frame.

Another problem with adding support members or modifying vehicle frames to accommodate the installation of added or modified drive components is that, oftentimes, the installation of such support members is permanent, whereby it is very difficult to restore the frame to its original form and to reinstall the original standard components such as the engine or the like.

The present invention is drawn to solve the problems associated with the addition of support cross members in motor vehicle frames by providing a mounting assembly for mounting those cross members to the side beams of the vehicle frame while maintaining the structural integrity of the frame. Furthermore, the present invention discloses an apparatus and method for providing adequate support and adequate space for the installation of drive line components such as engines, overdrives, etc. Furthermore, the present invention discloses a mounting assembly that would enable one to restore the original configuration of the frame and to reinstall the original drive line components of the vehicle with very little effort and without affecting the structural integrity of the frame.

These and other objects and advantages of the invention will appear from the following description.

SUMMARY OF THE INVENTION

Accordingly, the present invention discloses a mounting assembly for mounting an accessory hanger to the side beam of the frame to provide support for drive line components such as engines, overdrive, etc. The accessory hanger is mounted to the opposing sides of the channel formed on the interior side of the frame rail by welding the accessory hanger or a mounting member connected to the hanger to the opposing sides of the channel formed on the interior side of the frame rail whereby the structural problems inherent in disturbing the trough portion of the channel are avoided. In order to facilitate the quick removal of the accessory hanger, a plate or similar member is welded to the sides of the channel and the plate is connected by nuts and bolts or similar means to the accessory hanger. Two accessory hangers are installed to support the installation of a heavy engine in place of the standard engine towards the front portion of the frame. Similarly, two accessory hangers are provided in the middle portion of the frame to support the installation of an overdrive assembly.

The invention also discloses a method and apparatus for enlarging the engine compartment of a motor vehicle to accommodate the installation of an engine that is larger than the standard engine previously installed by providing spacers between the frame and the body of the motor vehicle to raise the body with respect to the frame, whereby the height of the engine compartment is increased to accommodate the larger engine. The spacers include sleeves placed over upwardly projecting bolts extending through pads from the side beams or the cross beams of the frame and being received by corresponding mounting holes in the body; in the case of pick-up trucks, the spacers include elongated members made of wood that are placed across the frame between the frame and the truck bed to raise the bed together with the truck cab being raised by the sleeved spacers.

BRIEF DESCRIPTION OF THE DRAWINGS

For a detailed of the invention, reference will be made to the accompanying drawings, wherein:

FIG. 1 is a perspective view of a motor vehicle frame having accessory hangers in accordance with the present invention;

FIG. 2 is an exploded perspective view of an accessory hanger and the mounting assembly for mounting the accessory hanger to the frame shown in FIG. 1;

FIG. 3 is a cross sectional view of the accessory hanger and the motor vehicle frame shown in FIG. 1 taken on line 3—3 of FIG. 1;

FIG. 5 is an exploded perspective partial view of another embodiment of the motor vehicle frame shown in FIG. 1;

FIG. 6 is an exploded view of the embodiment shown in FIG. 5; and

FIG. 7 is a cross sectional view of the accessory hanger and the motor vehicle frame shown in FIG. 5 taken on line 7—7 of FIG. 5.

DESCRIPTION OF THE PREFERRED EMBODIMENT

Standard Vehicle Frame

Figure 4:
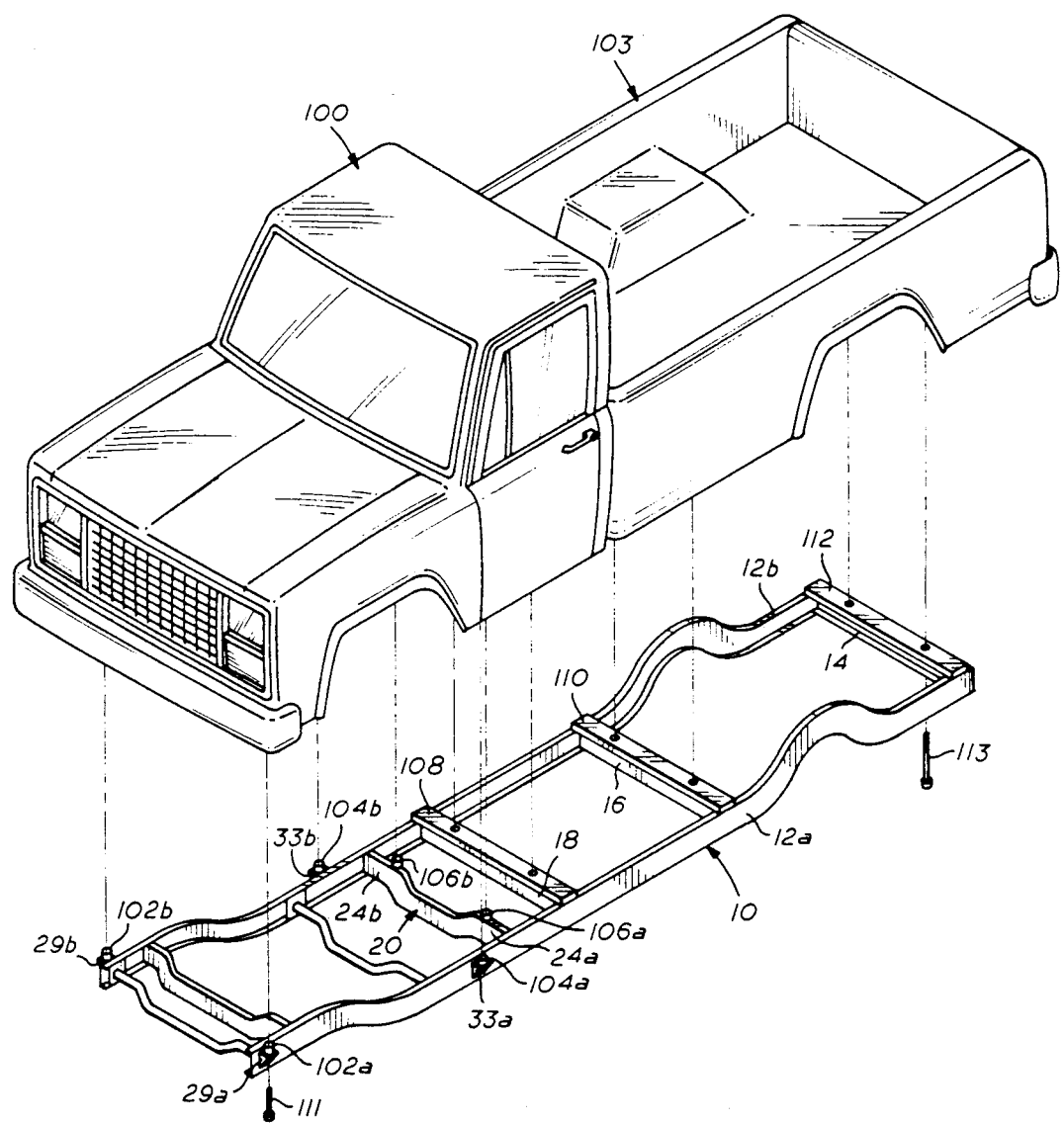
FIG. 4 is a perspective view of another embodiment of the motor vehicle frame shown in FIG. 1.

Referring now to FIG. 1 there is shown a vehicle chassis or frame 10 having two generally parallel side beams 12a and b. Side beams 12a and b are of a channel beam construction. The channeled sides of beams 12a and b face towards the interior of frame 10. Side beams 12a and b are connected by cross beam 14 at the rear portion of frame 10, cross beams 16 and 18 at the middle portion of frame 10 and cross beams 20 and 22 at the front portion of frame 10. Frame 10 having side beams 12a and b and cross beams 14, 16, 18, 20 and 22 is a standard frame being manufactured by the automobile manufacturers for use in motor vehicles including, but not limited to, passenger cars, pick-up trucks, recreational vehicles, etc. Cross beams 14, 16, 18, 20 and 22 are integrally attached to the channeled sides of side beams 12a and b by welding or similar means in the factory utilizing well-known techniques such as stress relief, quenching, etc. to ensure the structural integrity of frame 10.

Cross beams 14, 16 and 18 are generally straight beams. Cross beams 14, 16 and 18 include vertical apertures 23a and b, 25a and b, and 27a and b, respectively. Cross beam 20 includes generally straight end portions 24a and b and a middle bent portion 26 contoured to fit and support the transmission of the engine of the vehicle. Furthermore, cross beam 20 includes vertical apertures 28a and b in portions 24a and b, respectively.

Cross beam 22 is comprised of generally straight end portions 30a and b and a medium bent portion 32 contoured to fit and receive the front end of a standard engine.

First and second gussets 29a and b are welded on the forward end of exterior surface of side beams 12a and b, respectively. First gusset 29a includes an aperture 31a and second gusset 29b includes an aperture 31b. Third and fourth gussets 33a and b are welded on the middle portion of the exterior surface of side beams 12a and b, respectively. Third and fourth gussets 33a and b include apertures 35a and b, respectively.

The standard configuration of frame 10 described hereinabove is presently used to support a standard engine (not shown) by placing the engine on contoured cross bars 20 and 22 by well known means and methods. The body of the passenger automobile, recreational vehicle, etc. or the truck cab and bed are placed and bolted on frame 10. Bolts (not shown) extending through apertures 23a and b, 25a and b, 27a and b, 28a and b, 31a and b, and 35a and b are received by corresponding mounting holes (not shown) in the body or in the cab and bed of the vehicle to securely mount the body to frame 10.

The standard frame configuration and frame body combination described hereinabove is designed to support and house a standard size engine normally provided with the vehicle by the manufacturer of such vehicle. Oftentimes, however, it is desirable to substitute the standard engine with an engine that is more powerful and/or more efficient, an engine that is more readily available or an engine that is generally more economical. One difficulty with such substitution is that in some instances the support provided by cross beams 20 and 22 is not sufficient because the substitute engine is heavier than the original engine. Another difficulty, is that some substitute engines, although not heavier than the original ones, are constructed differently than the original ones and could not be supported by cross beams 20 and 22 because of the location of those cross beams. Another difficulty is that, sometimes, the engine compartment formed by the frame and the body or the cab is not large enough to house the larger engine.

Frame Modification for Providing Support for Substitute Engine Being Heavier than the Original Engine Still referring to FIG. 1, additional support for a substitute engine that is heavier than the original engine is provided by first accessory hanger 40 and second accessory hanger 42. Accessory hanger 40 is a generally tubular member having generally straight end portions 44a and 44b and middle bent portion 46 contoured to fit the bottom of the heavier substitute engine. Accessory hanger 40 further includes brackets 48a and b being welded to and extending from end portions 44a and b, respectively. Brackets 48a and b are used to mount the transmission of the larger engine on accessory hanger 40. Brackets 48a and b, however, may not be necessary in some applications. In those cases, brackets 48a and b are not included.

Referring now to FIG. 2, there is shown an exploded view of the connection between side beams 12a and b and accessory hanger 40. A generally rectangular mounting plate 50a is attached to first side beam 12a by welding two ends thereof to channel sides 52a and 54a of side beam 12a. Similarly, a generally rectangular mounting plate 50b is attached to side beam 12b by welding two opposing ends thereof to channel sides 52b and 54b of side beam 12b. A first bracket plate 58a is welded to the first end of accessory hanger 40 and a second bracket plate 58b is similarly mounted to the opposite end of accessory hanger 40. Mounting plates 50a and b include a plurality of holes 62a and b, respectively. Bracket plate 58a includes a plurality of holes 64a corresponding to holes 62a and bracket plate 58b includes a plurality of holes 64b corresponding to holes 62b. Accessory hanger 40 is securely attached to side beams 12a and b by aligning holes 62a with holes 64a and holes 62b with holes 64b and securely affixing mounting plate 50a to bracket plate 58a by bolt and nut means 66a and mounting plate 50b to bracket plate 58b by bolt and nut means 66b.

Referring now again to FIG. 1, accessory hanger 42 includes generally straight ends 72a and b and a middle bent portion 74 contoured to fit the front bottom end of the larger engine. Accessory hanger 42 includes an engine front plate 76 being supported by gusset means 78 and being welded to middle bent portion 74 of accessory hanger 42.

Referring now to FIG. 3, there is shown accessory hanger 42 being connected to side beams 12a and 12b by mounting assembly means that are similar to the mounting assembly means connecting accessory hanger 40 to side beams 12a and b. More particularly, there is shown a pair of mounting plates 82a and b having two ends welded to the channel sides of side beam 12a and b respectively. Bracket plates 84a and b are welded to the ends of accessory hanger 42. Bracket plate 84a is securely attached to mounting plate 82a by a plurality of bolts and nuts 86a received in a plurality of aligned holes in bracket plate 84a and mounting plate 82a, respectively. Similarly, bracket plate 84b is attached to mounting plate 82b by a plurality of bolts and nuts 86b received by a plurality of aligned holes in bracket plate 84b and mounting plate 82b, respectively.

Accessory hangers 40 and 42 provide the additional support required for the heavier substitute engine. The unique mounting assembly described hereinabove enables one to mount accessory hangers 40 and 42 to side beams 12a and b without adversely affecting the structural integrity of frame 10. Furthermore, the unique mounting assembly described herein enables one to easily remove accessory hangers 40 and 42 from frame 10 if one desires to remove the larger engine and replace it with the original standard engine without changing the structure or utility of the frame and without adversely affecting its structural integrity. In the latter case, mounting plates 50a and b remaining welded to frame 10 would not interfere with any other parts or accessories.

Although mounting plates 50a and b and mounting plates 82a and b could be welded to the channel sides of side beams 12a and b without any particular horizontal or vertical orientation, it is preferred that mounting plates 50a and b and 82a and b be positioned and welded to the channel sides of side beams 12a and in a generally parallel configuration with respect to the troughs of the channels. In that parallel configuration, the crystalline structure of the frame is minimally disturbed by the welding of the mounting plates to the channel sides.

Frame Modification for Providing Support for a Substitute Engine Requiring Support in Different Locations than the Original Engine Although the aforementioned discussion relates to frame modification for providing support for a substitute engine that is heavier than the original engine, it should be understood that similar modifications could be made to the frame by installing accessory hangers in order to provide support for a substitute engine that requires support at points in which support could not be provided by standard cross bars 20 and 22. Because the modifications required to provide for such support are similar to the ones previously discussed for the installation of heavier substitute engine, no further discussion is necessary and one skilled in the art should be able to modify the frame in order to accommodate a substitute engine that could not be supported by standard cross bars 20 and 22 alone.

Enlargement of the Engine Compartment

Oftentimes, the installation of a larger engine in the place of the standard engine requires the availability of a larger engine compartment in addition to the requirement of additional support. Referring now to FIG. 4, there is shown another embodiment of the present invention for enlarging the engine compartment. More particularly, a cab 100 of a truck is raised with respect to frame 10 by providing spacing means 102a and b, 104a and b, and 106a and b. Spacing means 102a and b, 104a and b, and 106a and b are tubular members being placed individually on gussets 31a and b, 33a and b and end portions 24a and b, respectively. Spacing means 102a and b, 104a and b, and 106a and b are coaxially aligned with apertures 31a and b, 35a and b, 28a and b (not shown), respectively, to receive bolt means 111. Cab 100 rests on spacing means 102a and b, 104a and b, and 106a and b and is bolted to the body by bolt means 111. In that position, cab 100 is raised with respect to frame 10 by the magnitude of the length of spacing means 102a and b, 104a and b, and 106a and b. Therefore, the height of the engine compartment is increased by that magnitude, thereby enlarging the available volume therein for the larger engine.

Bed 103 of the truck is also raised by the same height by providing spacing means 108, 110, and 112 being placed on cross bars 18, 16, and 14, respectively. Spacing means 108, 110, and 112 constitute elongated members being placed along substantially the entire length of those cross members. Bed 103 rests on spacing means 108, 110, and 112 and is bolted to frame 10 by bolt means 113. Although spacing means 108, 110, and 112 could be spacing means similar to spacing means 102a and b, etc., it is preferred that the elongated members described herein be used to provide support for bed 103 along substantially the entire width thereof.

Although the embodiment shown on FIG. 4 discloses the raising of the cab and the bed of a truck, it should be understood that the body of a passenger vehicle, recreation vehicle, etc., could be similarly raised by providing spacers between the body and the frame. In the case of a passenger automobile or a recreation vehicle, the spacers would be preferably of the tubular type described hereinabove and would be placed between the body and the frame on the various gussets and cross members of the frame. Other spacer means could also be used.

Overdrive Support System

Referring now to FIG. 5, there is shown an alternative embodiment of the present invention depicting a portion of frame 10 carrying overdrive support means 200 to provide support for an overdrive unit (not shown) installed in the middle portion of frame 10 between cross beams 16 and 18. Overdrive support means 200 includes first and second overdrive hangers 202, 204 extending between side beam 12A and B.

Referring now to FIG. 6, there is shown an exploded view of hanger 202. First overdrive hanger 202 is a generally flat, elongated member having a curved middle portion 203, contoured to receive a portion of the overdrive unit, and apertures 208a on one end and apertures 208b on the other end. Mounting plates 210a and b and mounting release plates 212a and b are provided in order to mount overdrive hanger 202 to side beams 12a and b. Mounting plate 210a is mounted to beam 12a by welding two opposing ends thereof to side walls 52a and 54a of the channel. Mounting plate 210a includes apertures 214a. Similarly, mounting plate 210b having apertures 214b is mounted to side beam 12b by welding two opposing ends thereof to side walls 52b and 54b of channeling side beam 12b. Although mounting plates 210a and b could be welded to the channel sides of side beams 12a and b without any particular horizontal or vertical configuration, it is preferred that plates 210a and b be positioned and welded to the channel sides of side beams 12a and b in a generally parallel configuration with respect to the troughs of the channels.

Mounting release plate 212a includes a first flat portion 216a having apertures 218a corresponding to apertures 214a of mounting plate 210a and a second flat portion 220a being perpendicular and welded to first flat portion 216a. Second flat portion 220a includes apertures 222a corresponding to apertures 208a of first overdrive hanger 202.

Mounting release plate 212b is a mirror image of mounting release plate 212a having apertures 218b corresponding to apertures 214b of mounting plate 210b and apertures 222b corresponding to apertures 208b of first overdrive hanger 202.

In the assembled position, mounting release plate 212a is securely attached to mounting plate 210a by nut and bolt means 224a extending through aligned apertures 214a and 218a. Similarly, mounting release plate 212b is securely attached to mounting plate 210b via nut and bolt means 224b. One end of first overdrive hanger 202 is securely attached to mounting release plate 212a by nut and bolt means 226a being bolted into aligned apertures 208a and 222a. Similarly, the other end of first overdrive hanger 202 is securely affixed to mounting release plate 212b by placing nut and bolt means 226b through aligned apertures 208b and 222b.

Referring now to FIG. 7, there is shown a cross sectional view of hanger 204 along line 7—7 of FIG. 5. Second overdrive hanger 204 is connected to side beams 12a by mounting means that are similar to the mounting means by which first overdrive hanger 202 is connected to side beams 12a and b. Accordingly, second overdrive hanger 204 is a generally flat, elongated member having a curved middle portion 230 and apertures (not shown) for connecting one end thereof to a mounting release plate 232a via bolt means 234a and the other end thereof to a mounting release plate 232b via bolt means 234b. Mounting plate 236a is mounted to beam 12a by welding two opposing ends thereof to sidewalls 52a and 54a of the channel. Similarly, mounting plate 236b is mounted to beam 12b by welding two opposing ends thereof to sidewalls 52b and 54b of the channel. Second overdrive hanger 204 is releasably attached to mounting plate 236a by attaching mounting release plate 232a to modify plate 236a via nut and bolt means 238a. Similarly, second overdrive hanger 204 is releasably attached to mounting plate 236b by attaching mounting release plate 232b to mounting plate 236b via nut and bolt means 238b.

Referring now against to FIG. 5, in the assembled position, a brace 242 extends between first and second overdrive hangers 202 and 204. Brace 242 is contoured to receive a portion of the overdrive unit. The brace is releasably connected to overdrive hangers 202 and 204 by well known nut and bolt or other means (not fully shown).

The overdrive support means described herein are easily removable from the vehicle frame by removing the miscellaneous nut and bolt means. Accordingly, one may remove or install the overdrive unit very conveniently without adversely affecting the structural integrity of the frame.

EXAMPLE

An example utilizing the present invention is disclosed herein for the sole purpose of demonstrating the use of the invention. A standard 440 cubic inch Chrysler engine with a 727 transmission of a Dodge Ram one (1) ton pick-up truck was replaced with a V-6 53 Detroit Diesel AT-540 Allison transmission. Referring now to FIGS. 1, 2, 3 and 5, first and second accessory hangers 40 and 42 were constructed utilizing $2\frac{1}{2}''$ Schedule 40 pipe. Mounting plates 50a and b and 82a and b were constructed of $6''\times6''\times\frac{3}{8}''$ steel plates and were welded to the sides of the channels of side beams 12a and b. Each mounting plate included four apertures for receiving four $\frac{1}{2}''$ bolts. Bracket plates 58a and b and 84a and b made out of $5\frac{3}{4}''\times5\frac{3}{4}''\times\frac{3}{8}''$ steel plates were welded to the end of accessory hangers 40 and 42 as described hereinabove. Each bracket plate included holes for receiving bolt means for attaching accessory hangers 40 and 42 to the appropriate mounting plates.

The engine compartment was enlarged by providing spacers between the cab of the truck and the frame and the bed of the truck and the frame. Spacing means 102a and b, 104a and b, and 106a and b were tubular members made out of steel and having $2\frac{1}{2}''$ length, $3''$ outside diameter with $\frac{1}{2}''$ hole for receiving $\frac{3}{8}''$ annular bolts. The anchor bolts 111 provided to attached cab 100 to frame 10 were approximately 5" to 6" long. The bed of the truck was raised by placing three elongated oak wood members having an approximate width of four inches and a thickness of 2.5 inches on cross beams 14, 16, and 18, respectively.

The substitute engine was bolted to frame 10 by, among other things, bolting the engine to brackets 48a and b and plate 76.

A similar modification as the one described hereinabove involved the substitution of a 454 cubic inch gas engine with a 400 turbo transmission of a one (1) ton pick-up Chevrolet of 30 or 35 series with a V-6 53 Detroit Diesel AT-540 Allison transmission engine.

While preferred embodiments of the present invention have been shown and described, modifications thereof can be made by one skilled in the art without departing from the spirit of the invention. For example, it should be understood that the sizes and the specifications of the materials used to construct the accessory hangers, the mounting assemblies, the spacing means, and all other material used to modify the vehicle frame to accommodate the installation of additional or larger drive line components may vary according to the specific need and the specific application. Accordingly, the present invention is not limited to the use of accessory hangers of certain size or material as long as the size and material is sufficient to provide the necessary support. Furthermore, it should be understood that although the aforementioned frame modifications are more applicable in large vehicles such as trucks, recreation vehicles, etc., the frame modifications disclosed herein are not limited to those vehicles but are applicable to all motor vehicles in which one desires to increase the support capability of the frame and the size compartment of the engine to accommodate the installation of heavier, larger, modified, different or additional drive line components. Furthermore, it should be understood that, while it is preferred to use the mounting assembly in modifying vehicle frames having I-beam or channel beam construction, the invention may be conveniently practiced with other vehicle frame types.

What is claimed is:

1. A mounting assembly for mounting an accessory hanger to a motor vehicle frame which is constructed with channeled side beams comprising:

a first beam mounting member engaging the sides of the channel of a first side beam of the frame, the first beam mounting member having a substantially flat first beam mounting member surface;

a first hanger mounting member having a first plate portion and a second plate portion being rigidly attached to the first plate portion and being substantially perpendicular to the first plate portion, the first plate portion being compatible with and attachable to the flat first beam mounting member surface and the second plate portion being compatible with and rigidly attachable to one end of the accessory hanger by bolt means; and first attaching means for engaging the first plate portion of the first hanger mounting member with the flat first beam mounting member surface and for attaching the first hanger mounting member to the first beam mounting member.

* * * * *